M. A. OLESON.
APPARATUS FOR USE IN CUTTING GLASS PLATES.
APPLICATION FILED AUG. 15, 1916.
1,242,028.
Patented Oct. 2, 1917.
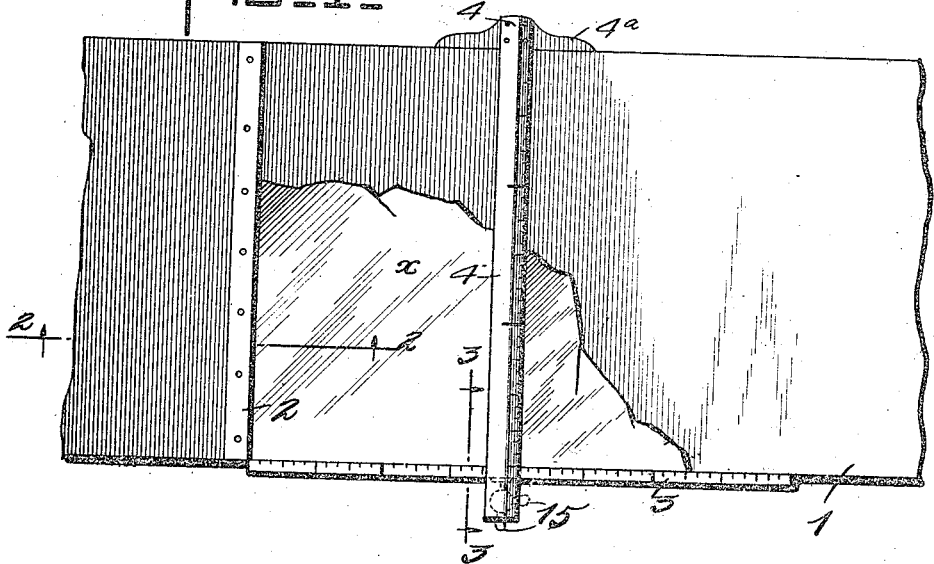
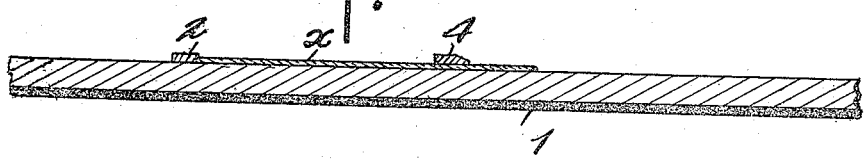
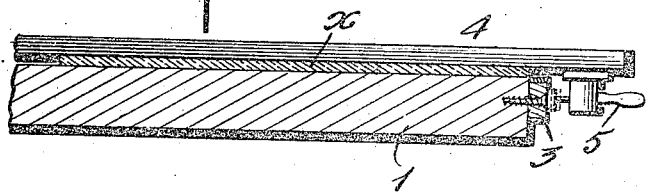
Inventor
MARTIN A. OLESON,
Witnesses

UNITED STATES PATENT OFFICE.

MARTIN A. OLESON, OF GERALDINE, MONTANA.

APPARATUS FOR USE IN CUTTING GLASS PLATES.

1,242,028.

Specification of Letters Patent.

Patented Oct. 2, 1917.

Application filed August 15, 1916. Serial No. 114,947.

*To all whom it may concern:*

Be it known that I, MARTIN A. OLESON, a citizen of the United States, and a resident of Geraldine, in the county of Chouteau and State of Montana, have invented a certain new and useful Improvement in Apparatus for Use in Cutting Glass Plates, of which the following is a specification.

An object of my invention is to provide a simple and inexpensive but efficient means for cutting glass plates into any stock or desired size.

The means I employ constitute three graduated bars applied to a store counter or to a table, two of them being fixed in place and the third movable or adjustable on the face of the counter, as hereinafter described.

In the accompanying drawings:

Figure 1 is a plan view of a counter or table top with my improvement applied;

Fig. 2 is a cross section on the line 2—2 of Fig. 1; and

Fig. 3 is a section on the line 3—3 of Fig. 1.

In the several figures, the numeral 1 indicates a flat counter or table top, and 2 and 3 the fixed bars thereof. The bar 2 is arranged crosswise of the counter and secured thereto by screws or nails, and is raised slightly above the counter to adapt it to serve as an abutment for the glass plate $x$ to be cut. The bar 3 is attached to the front edge of the counter or table top and extends to the right from the front end of the fixed bar 2. Its upper edge is flush with the top of the counter or table.

It will be understood that its upper side is flush with the surface of the counter or table top $x$. The movable bar 4 overlies the counter and is parallel to the fixed bar 2, toward and from which it is adjustable. It is provided with a head $4^a$ and is therefore practically in the form of a T-square.

The bars 3, and 4 are graduated in inches and fractions thereof.

When it is desired to cut a glass plate $x$ of irregular form into a stock or standard size or shape, it is laid on the counter or table 1, as shown in Figs. 2 and 3, with one end abutting the fixed cross bar 2; and then movable bar 4 is adjusted over the plate $x$, so that the operator is enabled to determine at a glance the length and width of the rectangular piece to be cut.

In cutting off a portion of the glass plate $x$, over which the movable bar 4 extends, it is expedient that the movable bar shall be securely fastened in place, and for this purpose I provide its front end with a lever clamp 5 which acts against the fixed bar 3, as will be readily understood.

I claim:—

An improved apparatus for use in glass cutting, the same consisting of a flat counter top or table having a cross-bar fixed transversely thereon and raised above it to serve as an abutment, a graduated bar fixed to the front edge of the counter flush with the surface of the latter, and a movable scale bar extending across the counter and having a head at one end and a clamp at its other for engaging the counter and the graduated front bar, as described.

MARTIN A. OLESON.

Witnesses:
 E. P. JOHNSON,
 C. VAN DERVOORT.

Copies of this patent may be obtained for five cents each, by addressing the "Commissioner of Patents, Washington, D. C."